(12) United States Patent
Keppel et al.

(10) Patent No.: US 9,766,685 B2
(45) Date of Patent: Sep. 19, 2017

(54) CONTROLLING POWER CONSUMPTION OF A PROCESSOR USING INTERRUPT-MEDIATED ON-OFF KEYING

(71) Applicant: Intel Corporation, Santa Clara, CA (US)

(72) Inventors: David Keppel, Seattle, WA (US); Jawad Nasrullah, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 296 days.

(21) Appl. No.: 13/894,642

(22) Filed: May 15, 2013

(65) Prior Publication Data

US 2014/0344596 A1    Nov. 20, 2014

(51) Int. Cl.
    *G06F 1/32*    (2006.01)

(52) U.S. Cl.
    CPC ............ *G06F 1/324* (2013.01); *G06F 1/3206* (2013.01); *G06F 1/3287* (2013.01); *Y02B 60/1282* (2013.01); *Y02B 60/32* (2013.01)

(58) Field of Classification Search
    CPC .... G06F 1/3287; G06F 1/3237; G06F 1/3206; G06F 1/324
    See application file for complete search history.

(56) References Cited

U.S. PATENT DOCUMENTS

| | | | |
|---|---|---|---|
| 5,983,355 A * | 11/1999 | Kenny et al. | 713/322 |
| 8,612,786 B1 * | 12/2013 | Lachwani et al. | 713/322 |
| 8,856,566 B1 * | 10/2014 | Jane | 713/320 |
| 8,924,752 B1 * | 12/2014 | Law et al. | 713/322 |
| 2005/0215227 A1 * | 9/2005 | Vu et al. | 455/343.2 |
| 2007/0260794 A1 * | 11/2007 | Ashish et al. | 710/267 |
| 2007/0288778 A1 | 12/2007 | Zhuang et al. | |
| 2009/0077401 A1 * | 3/2009 | Tsai | 713/320 |
| 2009/0150696 A1 * | 6/2009 | Song et al. | 713/323 |
| 2010/0060342 A1 * | 3/2010 | Rozen | H03K 19/0016 327/535 |
| 2010/0082866 A1 * | 4/2010 | White et al. | 710/260 |
| 2010/0228955 A1 * | 9/2010 | Niggemeier et al. | 712/214 |
| 2011/0040995 A1 * | 2/2011 | Basak et al. | 713/324 |
| 2011/0213992 A1 * | 9/2011 | Satsangi | G06F 1/3209 713/300 |
| 2012/0166731 A1 * | 6/2012 | Maciocco et al. | 711/130 |
| 2012/0166838 A1 * | 6/2012 | Nasrullah et al. | 713/322 |
| 2012/0210104 A1 | 8/2012 | Danko | |

(Continued)

FOREIGN PATENT DOCUMENTS

EP    2166457 A1    3/2010

OTHER PUBLICATIONS

U.S. Appl. No. 13/827,738, filed Mar. 14, 2013, entitled "Controlling Processor Consumption Using On-Off Keying Having a Maximum Off Time," by David Keppel, et al.

(Continued)

*Primary Examiner* — Vincent Tran
*Assistant Examiner* — Gary Collins
(74) *Attorney, Agent, or Firm* — Trop, Pruner & Hu, P.C.

(57) ABSTRACT

In an embodiment, a processor includes a logic to cause at least one core to operate with a power control cycle including a plurality of on times and a plurality of off times according to an ON-OFF keying protocol, where the on and off times vary depending on whether and when an interrupt is incurred. Other embodiments are described and claimed.

19 Claims, 10 Drawing Sheets

(56) References Cited

U.S. PATENT DOCUMENTS

2012/0331321 A1* 12/2012 Kaburlasos ............ G06F 1/3228
                                                                    713/323
2013/0007492 A1*  1/2013 Sokol et al. .................. 713/322
2013/0015904 A1*  1/2013 Priel et al. .................... 327/419
2013/0061064 A1   3/2013 Ananthakrishnan et al.
2013/0198549 A1*  8/2013 Longnecker et al. ........ 713/324
2014/0006817 A1*  1/2014 Bonen et al. ................. 713/320
2014/0189398 A1*  7/2014 Gorbatov et al. ............ 713/323
2014/0237276 A1*  8/2014 Machnicki et al. .......... 713/323
2014/0310540 A1* 10/2014 Herbeck ....................... 713/320

OTHER PUBLICATIONS

U.S. Patent and Trademark Office, Office Action mailed on Jun. 5, 2015 and Reply filed on Sep. 4, 2015, in U.S. Appl. No. 13/827,738.
United States Patent and Trademark Office, Notice of Allowance mailed Feb. 12, 2016 in U.S. Appl. No. 13/827,738.
United States Patent and Trademark Office, Final Office Action mailed Dec. 3, 2015 and Reply filed on Feb. 2, 2016 in U.S. Appl. No. 13/827,738.
European Patent Office, Extended Search Report dated May 11, 2015, in European Patent Application No. 1466867.3.

* cited by examiner

CONTROLLING POWER CONSUMPTION OF A PROCESSOR USING INTERRUPT-MEDIATED ON-OFF KEYING

TECHNICAL FIELD

Embodiments of the invention relate to systems and methods for energy efficiency and energy conservation including on-off keying for power control.

BACKGROUND

Power management techniques for computer systems and processors typically use dynamic voltage and frequency scaling. Reducing frequency allows reducing voltage, which improves efficiency. However, practical circuits have a minimum operating voltage, Vmin, and cannot operate below Vmin. At Vmin operation, typically there is also a most-efficient frequency, Fmin. Speed can be reduced below Fmin to reduce power, but speed drops faster than power, so efficiency suffers. Another technique includes software-generated requests for idle states, without direct control of voltage, other hardware parameters, and without a guarantee of the physical state that will result. The operating system is typically the software that generates the requests for idle states.

Furthermore, widespread use of computer systems for an ever-broader range of tasks, combined with software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, Ultrabooks™, tablets, mobile phones, processors, embedded systems, etc. become even more prevalent (from inclusion in the typical computer, automobiles, and televisions to biotechnology).

DETAILED DESCRIPTION

In various embodiments, a processor may be controlled to operate with an ON-OFF keying protocol such that, within a broader active time of the processor, at least portions of the processor are periodically placed into one or more power saving states. That is, ON-OFF keying in accordance with an embodiment of the present invention provides a cycle time, which itself may be of a variable time period. Each cycle of the cycle time includes an on time and an off time. As described herein, these on and off times may be of variable durations based at least in part on whether an interrupt is pending (e.g., received just prior to or during an off time). During the on time, the circuitry to be controlled, e.g., an entire processor, one or more cores thereof, or blocks of a core or other logic of a processor, is caused to be in an active state. Instead during the off time, the relevant circuitry is placed into a low power state in which no active work is performed. Such ON-OFF keying may be used in conjunction with other power management activities of a processor or a system, and as such this type of power control can be complementary to other types of power control of the processor or other computer system hardware.

Figure 1:
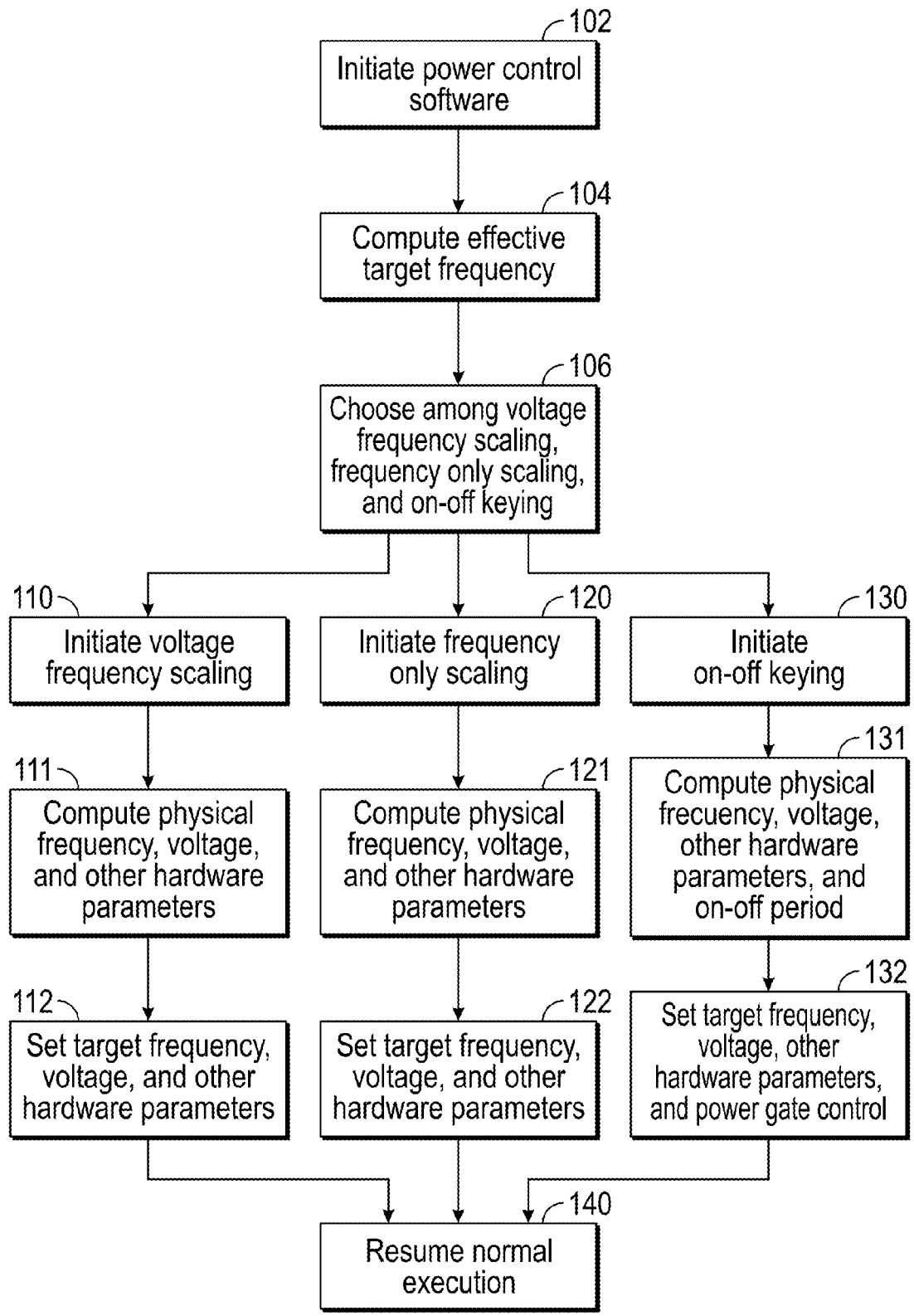
FIG. 1 illustrates a flow diagram of one embodiment for a computer-implemented method of controlling power of a device to reduce power consumption in accordance with one embodiment of the invention.

FIG. 1 illustrates a flow diagram of one embodiment for a computer-implemented method of controlling power of a device to reduce power consumption in accordance with one embodiment. The method is performed by processing logic that may comprise hardware (circuitry, dedicated logic, etc.), software (such as is run on a general purpose computer system or a dedicated machine or a device), or a combination of both. In one embodiment, the method is performed by processing logic associated with the devices or systems discussed herein.

At block 102, the processing logic initiates or invokes power control using power control software to operate the device in an energy-efficient manner. For example, the power control software may be associated with or located on a processor core or microcontroller. The processing logic computes an effective target frequency for a device based on one or more inputs at block 104. For example, the one or more inputs may include environmental sensors, silicon age monitors, etc. The one or more inputs may include power and other hardware monitors, platform and external hardware (e.g., input/output (I/O) devices), workload monitor, idle monitor, and user input. A low power mode may limit the target frequency to a different (lower) target frequency than a normal power mode. At block 106, the processing logic selects a power control method among various different power control methods. For example, these methods may include voltage-frequency scaling, frequency-only scaling, and ON-OFF keying. One of these methods is selected based on at least one of voltage and frequency conditions, the effective target frequency, and inputs that have been received. Alternatively, a default power control method may be selected or predetermined. In one embodiment, for a Vmin condition, the ON-OFF keying method is selected or used as a default. The ON-OFF keying method for Vmin and possibly other operating conditions as well (e.g., voltages greater than Vmin for a cost sensitive design or power limited design) provides a reduced leakage power during the OFF condition. Thus, the ON-OFF keying method provides less power consumption and more energy-efficiency in comparison to other power control methods.

At block 130, the power control with the ON-OFF keying method is initiated based on its selection or default selection at block 106. At block 131, the processing logic computes physical frequency and supply voltage for the device, other hardware parameters, and an ON-OFF period for the ON-OFF keying. At block 132, the processing logic sets the target frequency and target supply voltage for the device, other hardware parameters, and power gate control based on the ON-OFF keying. The physical frequency and supply voltage of the device may be adjusted to the target frequency and target supply voltage for the device. In one embodiment, the target frequency and target supply voltage are set as a single point design with the ON-OFF keying. At block 140, the device resumes normal execution.

Alternatively, at block 110, the voltage-frequency scaling method is initiated based on its selection at block 106. At block 111, the processing logic computes physical frequency and voltage for the device and other hardware parameters. At block 112, the processing logic sets the target frequency and voltage for the device and other hardware parameters. At block 140, the device resumes normal execution.

Alternatively, at block 120, the frequency-only method is initiated based on its selection at block 106. At block 121, the processing logic computes physical frequency and voltage for the device and other hardware parameters. At block 122, the processing logic sets the target frequency and voltage for the device and other hardware parameters. At block 140, the device resumes normal execution.

Figure 2:
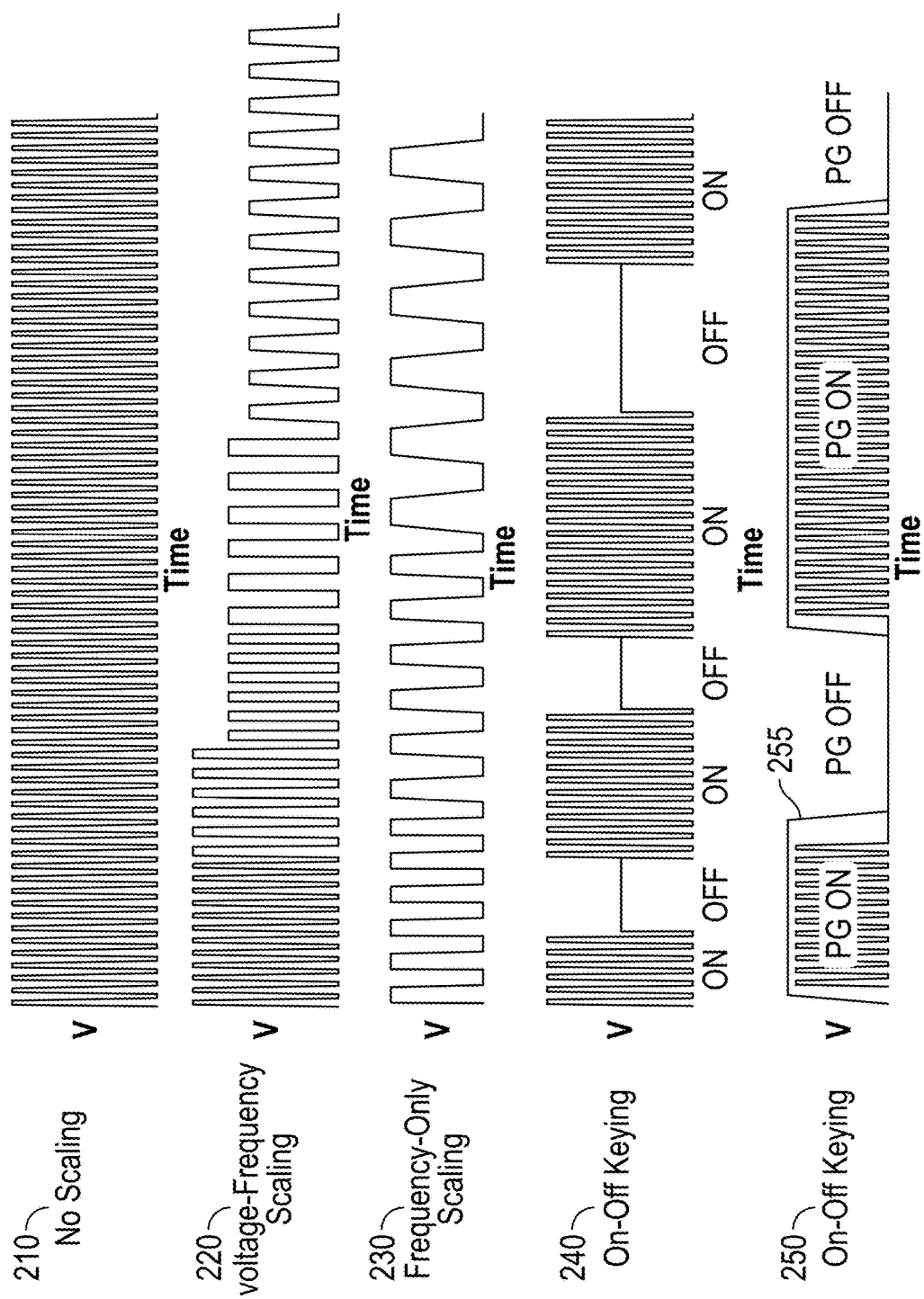
FIG. 2 illustrates exemplary power control waveforms associated with power control methods in accordance with one embodiment of the invention.

FIG. 2 illustrates exemplary power control waveforms associated with power control methods in accordance with one embodiment of the invention. The waveforms 210, 220, 230, 240, and 250 each represent voltage on a vertical axis and time on a horizontal axis. The waveform 210 provides no scaling and is provided as a reference waveform. The waveform 220 provides a voltage-frequency scaling method that scales both voltage and frequency. The waveform 230 provides a frequency-only scaling method that scales only frequency given a Vmin. The waveform 240 provides an ON-OFF keying method that modulates between ON and OFF. The waveform 250 provides another example of an ON-OFF keying method that shows power gate modulation between ON and OFF conditions as indicated by the waveform 255.

Figure 3A:
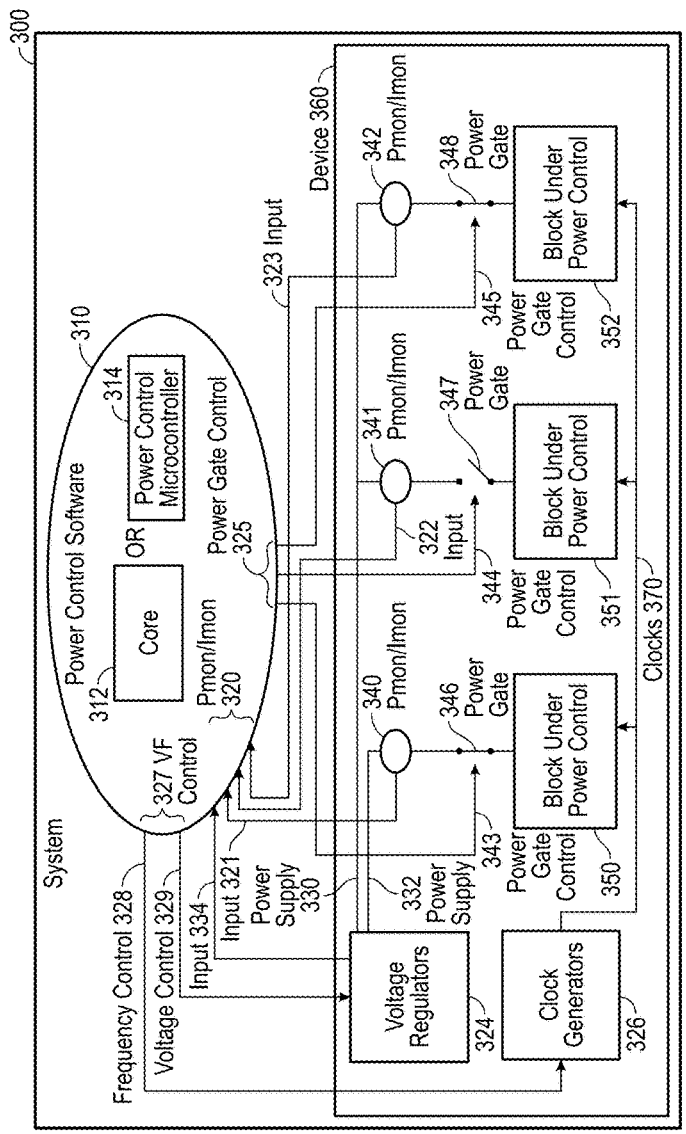
FIG. 3A illustrates a block diagram of a system having power control in accordance with one embodiment of the invention.

FIG. 3A illustrates a block diagram of a system 300 having power control in accordance with one embodiment of the invention. The system 300 includes power control software 310 that can be stored on or associated with a processor core 312 or a power control microcontroller 314. In an embodiment, microcontroller 314 is a power control unit (PCU) of a processor. For core 312, power control software 310 may be firmware that functions as an intermediate layer between a guest instruction set architecture (ISA) (e.g., x86 based instructions) and a host ISA. Alternatively, microcontroller 314 may store power control software 310. Power control software 310 receives one or more inputs 334 from voltage regulators 324 that are based on voltages of a power supply 330 and a power supply 332. A power or current monitor controller 320 receives inputs 321-323 from power or current monitors 340-342, respectively. The inputs 321-323 are used to determine whether power gates 346-348 are to be opened or closed. Power gate controller 325 generates outputs, namely power gate control signals 343-345, to control the position of power gates 346-348, respectively. A voltage frequency (VF) controller 327 generates outputs, namely a frequency control signal 328 and a voltage control signal 329, to control the frequency of clock generators 326 and voltage of voltage regulators 324, respectively. Clock signals 370 are provided to various blocks 350-352 of a device 360 that is under power control. In an embodiment, this device is a multicore processor that includes core 312, microcontroller 314 and a plurality of other processing engines such as multiple homogeneous or heterogeneous cores, graphics processing units, uncore circuitry and other logic. The voltage regulators 324 may also be located off-chip rather than on the device.

Although the following embodiments are described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems, and may be also used in other devices, such as handheld devices, systems on chip (SoCs), and embedded applications. Some examples of handheld devices include cellular phones, Internet protocol devices, digital cameras, personal digital assistants (PDAs), and handheld PCs. Embedded applications typically include a microcontroller, a digital signal processor (DSP), network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future, such as for power conservation and energy efficiency in products that encompass a large portion of the US economy.

Note that the ON-OFF keying protocol described herein may be independent of and complementary to an operating system (OS)-based mechanism, such as the Advanced Configuration and Platform Interface (ACPI) standard (e.g., Rev. 3.0b, published Oct. 10, 2006). According to ACPI, a processor can operate at various performance states or levels, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic or turbo mode state in which, when power and/or thermal budget is available, processor hardware can configure the processor or at least portions thereof to operate at a higher than guaranteed frequency. In many implementations a processor can include multiple so-called bin frequencies above a guaranteed maximum frequency, also referred to as a P1 frequency, exceeding to a maximum peak frequency of the particular processor, as fused or otherwise written into the processor during manufacture. In addition, according to ACPI, a processor can operate at various power states or levels. With regard to power states, ACPI specifies different power consumption states, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth).

Rather than using frequency scaling to control circuit power, one or more blocks of a processor can be controlled to operate at a most efficient operating point (in terms of frequency, Fmin), and operate using ON-OFF keying. Such power control can be more efficient than frequency adjustment because an always-running circuit has leakage always, but ON-OFF operation can reduce or eliminate leakage power during the off time by removing power or placing circuits on a retention voltage.

One limit to ON-OFF efficiency is shut down and restart overheads, which consume energy but do not contribute to useful work during the on time. Examples of such overheads include voltage ramping; clock restart; and state used for circuit operation that is lost when power is removed and so must be saved and restored.

Using ON-OFF keying according to an embodiment of the present invention, overheads are minimized by performing the smallest number of on/off transitions during any given time interval. Theoretically, the smallest number of on/off transitions is just one, but in practice processors are configured to satisfy timeliness constraints. As an example, somebody using a telephone, computer, or other interactive computing device would be intolerant of off times of hours or even minutes, because users are accustomed to devices making progress at sub-second intervals. Thus, off times are constrained to some maximum off time, which may be stored in a configuration storage of the system. In a given platform including a processor as described herein, each of many different system components may have a maximum off time associated with it. This maximum off time for each component is the longest off time that is acceptable for the responsiveness requirements of the given component. In an embodiment, the smallest of all such maximum off times may be designated as the maximum off time for the platform. Note that this maximum off time may change as components are added into and removed from a platform or as workloads change. For example, a time-sensitive component may be not in-use, in which case it does not contribute to the maximum off time, or the off time could be reduced when playing a game but increased for simple text typing, or increased further when the device is mostly idle.

In a system in which there is no distinction between the maximum off time for satisfying interrupt responsiveness constraints and the maximum off time for satisfying forward progress constraints, lost efficiency may occur because the system switches on to satisfy interrupt responsiveness constraints, even when no interrupt service is pending. Embodiments improve efficiency by distinguishing between the constraints, and thus reducing the number of on-off transitions. That is, the above-discussed maximum off time of the system is for situations in which no interrupt is received during the off time and thus it is referred to herein as a maximum background off time for the platform, t_off_background_max, in that the off time is set to ensure forward progress of background (e.g., non-interrupt related) tasks.

Instead when an interrupt occurs during an off time, a system may use a different maximum off time, namely a maximum interrupt off time, t_off_interrupt_max, that indicates a maximum amount of time the processor may be in an off state when an interrupt is received. This interrupt may either be received during the off time or may be a prior-received interrupt that has not been handled before entering into the off state. Note that the largest values for these two maximum off times are a property of the overall system and may typically be configured at different values. Embodiments may dynamically select, for each off period, between these two maximum off times based on the presence or absence of a pending interrupt.

As will further be described below, in some embodiments greater responsiveness when a pending interrupt is present during an off time may allow for improved average interrupt response time using yet another timing value, namely a minimum interrupt off time value, referred to herein as t_off_interrupt_min, which is less than or equal to t_off_interrupt_max. This minimum interrupt off time thus improves responsiveness in the average case while still guaranteeing that the worst case behavior is not longer than the maximum interrupt off time. And it also guarantees that energy consumption does not exceed any guarantees. That is, when the dynamic pattern of interrupts coincides at least sometimes with planned wake-ups, energy consumption is reduced from when interrupt wake-ups are separate from background wake-ups. When there is a saving, the difference between the guaranteed energy consumption and the observed lower energy consumption can optionally be used to improve average interrupt responsiveness. When the pattern of interrupts does not coincide, average responsiveness may be slower, but neither the worst-case guaranteed time nor energy cap are violated. Note that the cycles of on and off times may generally be controlled to maintain a requested speed or ratio of a given operating point.

With a single maximum off time, efficiency of ON-OFF keying may be reduced as this value would typically be set to support short average interrupt response times. In addition, with a single maximum off time, the processor wakes up after this maximum off time duration whether or not there is a pending interrupt, in order to assure normal forward progress. In systems with a single maximum off time, it is set at a maximum safe value dominated by interrupt latency concerns. However most wake-ups occur without an interrupt, and thus energy is wasted, since with no pending interrupts it would have been acceptable to stay off for a longer time period, e.g., twice as long and then stay on twice as long, so the same average rate of work is achieved, but with half as many energy-wasting switch-on and switch-off transitions.

Instead with interrupt-mediated ON-OFF keying in accordance with an embodiment of the present invention, in which interrupt and non-interrupt wake-ups are determined separately and periods without interrupts are used to avoid wake-ups, wasted energy is avoided for at least certain transitions. When an interrupt arrives, the processor wakes in a timely manner. When there is no interrupt, the processor still wakes eventually, to guarantee forward progress. For processors that can tolerate longer delays on non-interrupt work, the number of energy-wasting switch-on and switch-off events may be significantly reduced.

Further, many circuits have shallower and deeper low power modes, but a limit to using a deeper low power mode is the cost of switch-on and switch-off. Here, cost can be in terms of time and/or energy. When the on and off times are long, deeper low power modes can be used to reduce total energy use. However, when the on and off times are short, it is not possible to amortize the on/off costs of the deeper low power modes, and so the shallower modes are used. Using an embodiment as described herein, the average on/off times are increased, and thus it may be possible to both guarantee timely wakeup and use deeper low power modes to further improve efficiency compared to just reducing the number of switch-on/switch-off transitions.

Embodiments implement two different forward progress guarantees. The first guarantee is for background work, which is work that is to be performed but is not done in response to interrupts. Such work typically is non-interactive and thus has lax timing requirements. That is, the work is to be completed at some guaranteed long-term rate, and there is less importance in how much work is done in any given short period. As an example, audio streams are typically encoded or decoded using several seconds of buffering. Because of the buffering, it is unimportant whether the buffering advances in chunks of 1 microsecond, 1 millisecond, or 1 second, as long as the audio buffer never goes fully empty.

A second guarantee is for interrupt-driven work. Although interrupt-driven work may also be done in chunks, interrupt-driven work is often less tolerant of delays. For example, moving a mouse may generate an interrupt to move the screen cursor, and delays of more than a few milliseconds can be detected by users as lag or slowness in the user interface. Some interrupt-driven work is not interactive, but still has delay sensitivity. For example, disk and network data transfers may be batched, with the device sending an interrupt when the current batch work is completed. Delaying the interrupt can thus delay start of whatever work depends on the interrupt, leading to overall slower rates of work. For example, the interrupt may signal that a transfer is complete and so the underlying memory can be reused; delaying the interrupt means delaying the memory reuse and thus may delay the next data transfer.

Figure 3B:
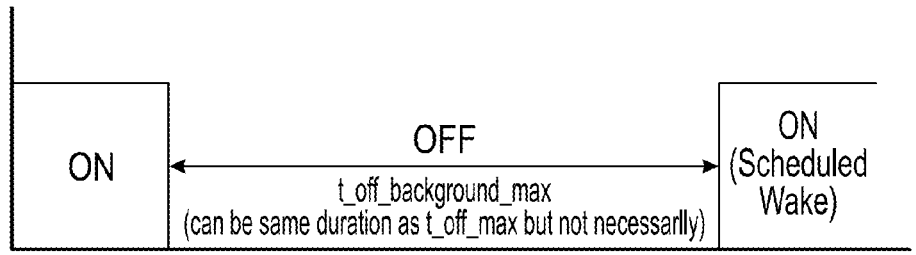
FIGS. 3B-3E show timing illustrations of various interrupt-mediated ON-OFF keying operation cases in accordance with an embodiment of the present invention.

The basic operation of interrupt-mediated ON-OFF keying is to switch affected circuits on and off. However, when switching off, the time until switch-on is not fixed. If there are no interrupts, the affected circuit stays off until t_off_background_max and then wakes. FIG. 3B shows a typical off period with no interrupt. Here, the system is switched off for an extended period, t_off_background_max. In an embodiment, the maximum background off time duration may be between approximately 1 and 100 milliseconds (ms) compared to approximately 50-200 microseconds (μs) for interrupt responsiveness.

When an interrupt arrives during the off time, there are several possible behaviors. As a first possible behavior, the circuit does not switch on sooner than t_off_interrupt_max. This ensures that ON-OFF keying minimum power guarantees are always met. If an earlier switch-on were allowed, then an adversarial workload could send interrupts immediately on each switch-off transition, and cause switch-on too soon, thus raising the average power beyond the guaranteed maximum.

Figure 3C:
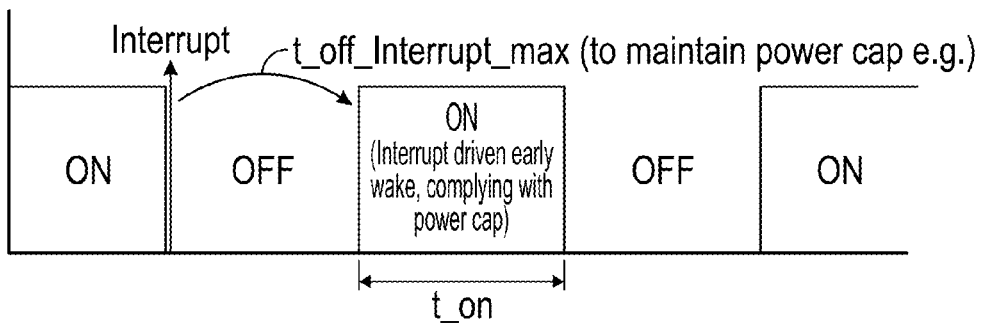

FIG. 3C shows an interrupt that occurs just after the system enters an off state. A switch-on is triggered after a wait period that is set to meet ON-OFF keying guarantees on power, t_off_interrupt_max. After that timer expires, the circuit wakes up and performs the pending tasks. Note that this maximum interrupt off time may be of shorter duration and possibly substantially shorter duration than the maximum background off time duration. In one such embodiment, the maximum interrupt off time duration may be between approximately 50-200 μs. This value may be configured to ensure that any power constraints under which the processor is operating are maintained.

Figure 3D:
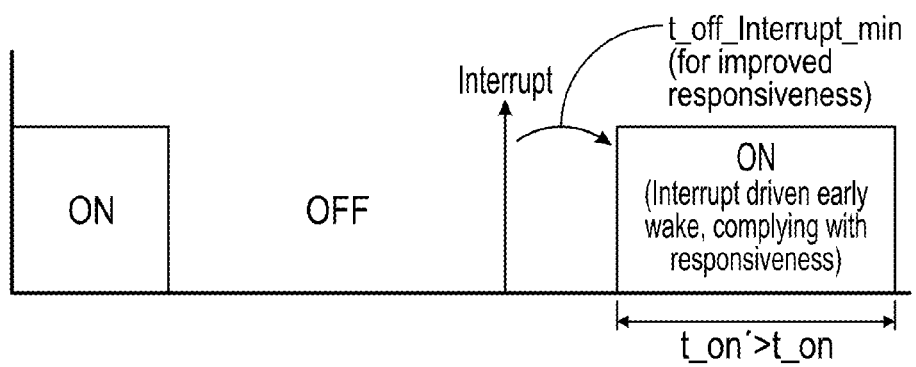
Figure 3E:
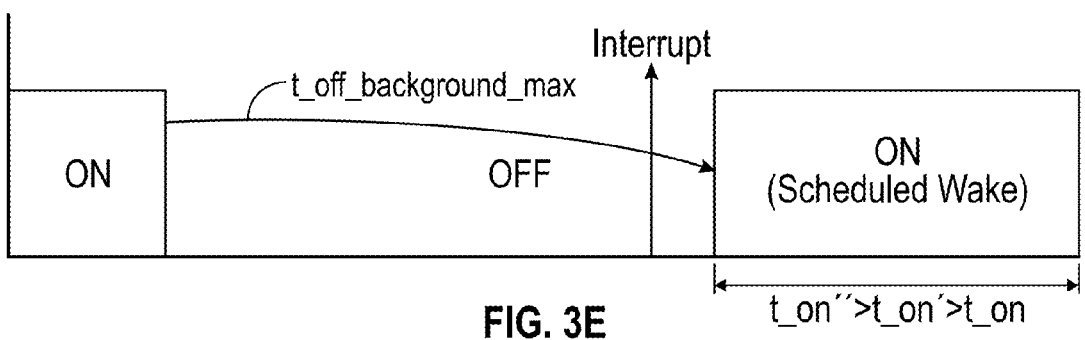

A second possible behavior is that the circuit does not switch on later than t_off_background_max. This ensures that background tasks make progress in a timely manner. Thus, an interrupt arriving near t_off_background_max will not delay wake-up beyond t_off_background_max, as shown in FIG. 3D. Although the scope of the present invention is not limited in this regard in an embodiment, this determination of whether to delay switch-on until a conclusion of the maximum background off time duration may be based on whether a threshold time remains before the conclusion of the off period. In one such embodiment, this threshold time may correspond to the minimum interrupt off time duration. Note that the on time is elongated when the off time is larger than t_off_interrupt_max, such that on and off times still reach the desired ratio.

A third possible behavior is that an interrupt is followed by a delay of t_off_interrupt_min and then the circuit switches on. That is, an interrupt arriving in the middle of the off time is delayed by an additional delay of t_off_interrupt_min, as shown in FIG. 3C. Note that this minimum interrupt off time is less than the maximum interrupt off time, and may occur when the circuit has available credit to provide this faster responsiveness, as described further below. Thus, when credits are available, they may be used to handle pending interrupts with greater responsiveness.

These various behaviors ensure that the circuit does not wake too soon to meet the power guarantees, and does not wake too late to meet background work performance guarantees. If t_off_interrupt_min is the same as t_off_interrupt_max, then the system always operates as efficiently as possible. If a smaller t_off_interrupt_min value is used, efficiency may be reduced, but average interrupt response time may be improved and the maximum energy/power cap is never violated.

An interrupt may arrive near the end of a switch-on period, and so the actual work performed for the interrupt may be delayed by the switch-off period. As embodiments seek to extend the switch-off time as much as possible, an interrupt near the end of a switch-on period will be delayed up to t_off_background_max, which may violate the interrupt responsiveness constraint. To avoid this delay, embodiments may provide additional techniques. First, an additional time description, t_interrupt_service_max, states the maximum running time of interrupt service. When an interrupt arrives, switch-on/switch-off is done as above according to t_off_interrupt_max, to ensure timely forward progress, until an elapsed execution time of t_interrupt_service_max has been reached. For example, if t_off_interrupt_max is 50 microseconds, and an interrupt service handler is expected to complete in 100 microseconds, then using 100 microseconds for t_interrupt_service_max leads to the following behavior: an interrupt that arrives more than 100 microseconds before switch-off does not affect t_on/t_off; but an interrupt that arrives less than 100 microseconds before switch-off causes ON-OFF keying to use t_off of 50 microseconds until 100 microseconds of t_on time has accumulated. Note for this purpose, interrupts occurring during the off time are handled as if they occur during the on time.

As a second technique to avoid undesired delay, an embodiment may use an end-of-interrupt marker to indicate background work is to be resumed. The marker may be execution of some recognizable implicit pattern. As one example, the marker may be a HALT instruction in a system in which an OS does not provide for execution of a HALT instruction during an interrupt service routine. As another example, the marker may be an explicit pattern (e.g., providing an "end of interrupt" instruction that is executed when interrupt service is done).

During interrupt-mediated ON-OFF keying, when an off interval is entered, the present time is recorded in a first storage such as a register. The affected circuit(s) is ensured to be in a low power state for at least t_off_interrupt_max, but this duration may extend for some longer time, t_off_actual. A ratio of on time to off time, r=t_on/(t_on+t_off)

"speed" is on time over the total cycle time, which corresponds to a requested speed or effective frequency, is also predetermined and stored in an appropriate storage. At switch-on, a new on time, t_on', may be calculated as follows: t_on'=r*(t_off_actual/t_off). For example, if the pre-calculated t_off is 100 microseconds but t_off_actual is 200 microseconds, then t_on' should be twice the pre-calculated t_on. Alternatively, if t_off is the background time and the system wakes sooner, then t_on' should be shorter. For example, if set to be off for 1000 microseconds and on for 800 microseconds, but an interrupt woke the system at 500 microseconds, then the on time of 800 should be reduced to 800*(500/1000)=400 microseconds. After running for a duration of t_on', the circuit has caught up with the extra off time and can again switch off.

Note that the off time, t_off_actual, may vary significantly from one off period to the next. The t_on' calculation described above leads to a similar variation in the time spent on from period to period. In some embodiments, control may be configured to switch on for some slightly shorter period and save up some on time as a credit. This saved on time or credit may then be used in a future cycle to reduce period-to-period variation. Alternatively or in addition, such credits may be used after an interrupt in order to further improve average interrupt responsiveness. With such credits, when an interrupt arrives just after switch-off, the interrupt response may occur sooner than the determined t_off_interrupt_max, as shown above in FIG. 3D. Thus, while the maximum off time is unchanged (because there may be no credits), when such credits are available, a circuit in a low power state may be controlled to wake at a reduced delay of t_off_interrupt_min.

Similarly, with some available on time credit, if an interrupt arrives just before switch-off, it may be possible to enable the affected circuit to stay on longer, e.g., up to t_interrupt_service_max, and thus service the interrupt with zero added (that is, added by ON-OFF keying) delay. Staying on using on time credits enables such operation to occur without violating ON-OFF keying power guarantees.

As noted above, circuits often offer deeper sleep states that save energy for long on/off times but waste energy for short on/off times. Interrupt-mediated ON-OFF keying does not guarantee long on/off times, but they may be long enough often enough that using deeper sleep and wasting some energy on occasional short on/off times yields significant average savings. That is, some loss on a few short on/off times may be overcome with gain on many long on/off times.

Interrupt-mediated ON-OFF keying can choose a strategy successfully because the energy costs and savings of various sleep strategies are typically predictable and are simple and efficient to model. For example, a fast shallow sleep state may place a media unit on a reduced retention voltage, while a slower but deeper sleep state saves the media unit state, turns it off, then at switch-on reloads the state. As these energy costs are predictable, an appropriate low power state can be determined by using historical on/off patterns and computed costs for the two strategies, then selecting the one which gives the lower average energy use.

Figure 4:
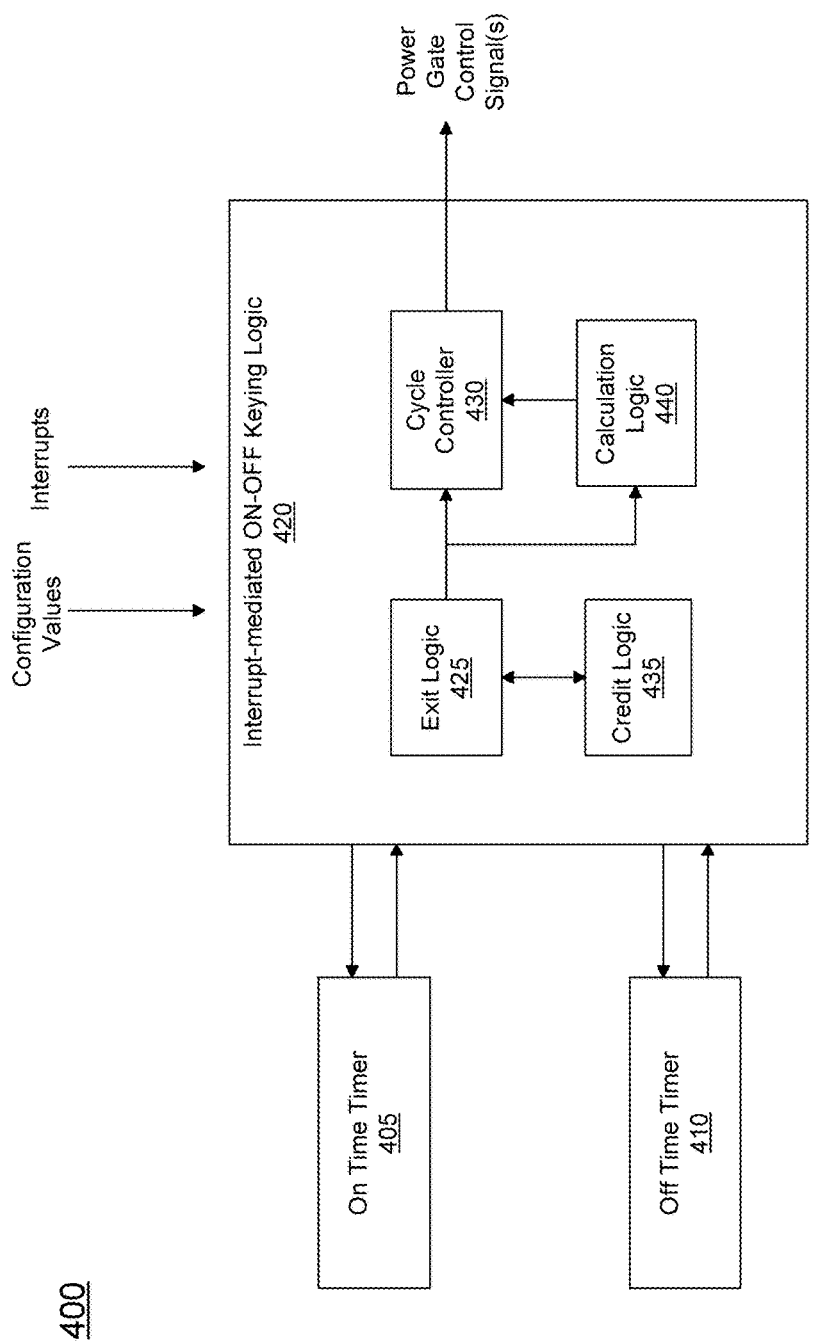
FIG. 4 is a block diagram of a power cycle logic in accordance with an embodiment of the present invention.

Referring now to FIG. 4, shown is a block diagram of a power cycle logic 400 in accordance with an embodiment of the present invention. Logic 400 may be implemented in various locations within a processor. In one embodiment, logic 400 may be dedicated logic within the processor including hardware configured to perform power control using interrupt-mediated ON-OFF keying. In another embodiment, logic 400 may be implemented within a power control unit (PCU) or other microcontroller of a processor. Still further, embodiments may be implemented within a processor core itself.

As seen in FIG. 4, logic 400 includes an interrupt-mediated ON-OFF keying logic 420 that itself is formed of various constituent logics. In addition, multiple timers are present. In an embodiment these timers may be configured as counters and controllably programmed by logic 420 to count to a configured value based on determined on and off times. More specifically as seen in FIG. 4 an on time timer 405 and an off time timer 410 are provided. When enabled by logic 420, each of these timers may begin counting to a configured value, e.g., for a duration of an on time for on time timer 405 and a duration of the maximum background off time for off timer 410.

As discussed, logic 420 is formed of constituent logics that receive various inputs, including the values from the timers. In addition, configuration values are received, which in an embodiment can include configured values for maximum on times and off times, a minimum interrupt off time, and other appropriate configuration values such as operating parameters of the circuits and usage preferences or "goals", such as the relative desire to spend "credits" on improved responsiveness or improved efficiency. In addition, logic 420 further receives indications of incoming interrupts. Although the scope of the present is not limited in this regard in an embodiment such interrupts may be various platform interrupts received in the processor, e.g., responsive to a user-based interrupts or another type of interrupt.

Logic 420 includes, in the embodiment shown in FIG. 4, an exit logic 425. Exit logic 425 is configured to determine when an exit from a low power state is allowed to occur. Exit logic 425 may make such determination based on the various configuration values interrupt receipt, as well as the duration of the current off time, among other factors. In an embodiment, exit logic 425 may generally operate in accordance with method 500 discussed below with regard to FIG. 5.

As further seen in FIG. 4, exit logic 425 is coupled to a cycle controller 430 which may perform power control in accordance with an embodiment of the present invention. More specifically, cycle controller 430 may be configured to communicate control signals to power gates associated with one or more processing units to be cycled on and off according to an ON-OFF keying technique as described herein.

Exit logic 425 is further coupled to a credit logic 435. In an embodiment, credit logic 435 may be configured to maintain credit information. More specifically, this credit information corresponds to a value that can be used by exit logic 425 to determine whether it is permissible to allow exit from a low power state prior to conclusion of the maximum background off time duration. As one such example, a credit value can be incremented for every interrupt that occurs relatively close to a conclusion of this maximum background off time duration such that the interrupt is held until the following on time. In one embodiment credits may be accounted for based on whether an exit from a low power state occurs prior to the maximum interrupt off time. If not, a credit counter may be updated (e.g., incremented). As one such example, when an interrupt is incurred close to when a wake up was to occur, a single wake up to service both the interrupt background tasks occurs and a credit value can be incremented. When a sufficient level of such credits is achieved (which may be at a configured value), exit logic 425 may cause an exit from a low power state responsive to an interrupt prior to conclusion of a maximum background off time duration (and more particularly after a minimum interrupt off time duration following receipt of the interrupt). In different implementations, only a predetermined amount of credits may be used. For improved responsiveness, the remainder may be unused to improve battery lifetime.

Still referring to FIG. 4, logic 420 further includes a calculation logic 440 which may be configured to calculate an on time value for a next on state. In an embodiment, the on time may be computed based on a length of the previous off state and an effective frequency, which in an embodiment corresponds to a requested speed. This effective frequency or speed may be enumerated as a percentage value, namely a percentage of a maximum efficient frequency. In turn this maximum efficient frequency in an embodiment may correspond to a minimum frequency at which the processor operates in an active state (e.g., Fmin). Thus this speed or ratio (which may be one of the configuration values received) causes control of the on times and off times to be variably updated, e.g., every cycle of the ON-OFF keying or according to some schedule. In certain embodiments, instead of updating the on time during every cycle a moving average may be applied to smooth out variations. Although shown at this high level in the embodiment of FIG. 4, understand the scope of the present invention is not limited in this regard. For example, an additional timer may be present to count the minimum interrupt off time duration.

Note that the requested speed may be received from various platform entities including software entities such as an OS or BIOS. For example in an implementation of a portable computing device such as a smartphone, triggering of a thermal sensor may cause system software to request that the effective frequency or speed be reduced to thus reduce power consumption, in turn reducing the thermal output. Such actions may occur when a smartphone is configured to not exceed a given temperature, as the phone may be carried within a user's pocket. Note that although shown at this high level in the embodiment of FIG. 4, understand the scope of the present invention is not limited in this regard.

Figure 5:
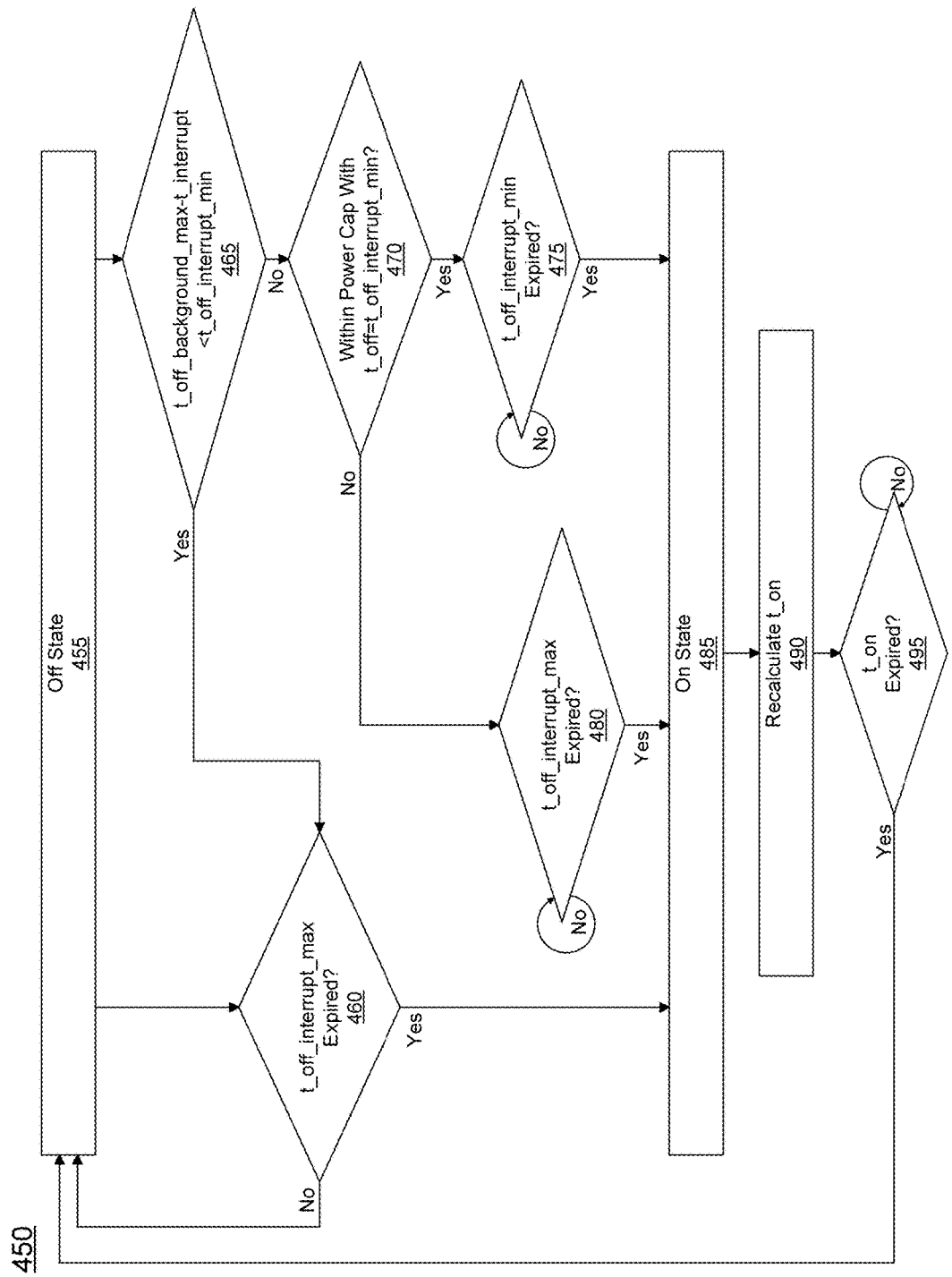
FIG. 5 is a flow diagram of a method for performing interrupt-mediated ON-OFF keying in accordance with an embodiment of the present invention.

Referring now to FIG. 5, shown is a flow diagram of a method for performing interrupt-mediated ON-OFF keying in accordance with an embodiment of the present invention. Method 450 may be performed by power control logic such as logic 400 of FIG. 4 or other processing logic within a processor. As seen, method 450 begins when a controlled circuit such as one or more cores, portions thereof or other circuitry of a processor is in an off state such as a given low power state. Note that depending on the indicated length of the off time, this low power state may be anywhere within a range of a relatively shallow low power state to a relatively deep low power state. As seen, there are two wake up cases from this off state, depending on whether an interrupt arrives during the off time.

If no interrupt is received prior to the conclusion of the off time, as indicated by value of a timer that is configured to count for a duration of the off state, namely t_off_background_max, control passes to diamond 460. Thus in the case where no interrupt is received, the determination at diamond 460 on conclusion of this timer is in the affirmative and accordingly, control passes to block 485 where the circuit may enter into the on state. Various operations are performed to thus power on the circuit, including appropriate controlling of various clocks, re-loading of state if needed and so forth, before useful work is performed in the on state.

During the on state, the on time itself may be re-calculated (block 490). That is, the on time is calculated based on the actual off time and is computed to correspond to the target ratio of t_on/(t_on+t_off) as described above, e.g., that corresponds to a requested speed, e.g., 50%. As such, if the actual off time during off state 455 was shorter than expected, the on time is similarly calculated to be shorter to maintain this requested speed. However note that in some embodiments, instead of a cycle-to-cycle re-calculation based only on a single cycle, long term rolling averages may be used to adjust the on time so that variability or unpredictability from one cycle to a next can be avoided.

Control passes from block 490 to diamond 495 to determine whether the on time thus calculated has expired. In an embodiment, this determination may be based on an on time timer configured to count to the duration of the on time. When this on time has expired, control passes back to block 455 for entry into a next off state.

Still referring to FIG. 5, the other wake up case from off state 455 is responsive to receipt of an interrupt during the off state. In this case, control passes to diamond 465, where it is determined whether the interrupt is received within a predetermined period before the background wake up event. In an embodiment this threshold may equal a minimum interrupt off time. If so, control passes to diamond 460, as described above to allow the circuit to wakeup in the normal off time conclusion, and with the background maximum off time, described above. In an embodiment providing for credit operation, this delay of wakeup may cause an update to the credit value.

Otherwise, if the interrupt is received earlier than this period before a selected background wakeup time, control next passes to diamond 470 to determine whether a power cap for the circuit may be maintained if the off time is limited to a minimum interrupt off time. In an embodiment this analysis may be based on a determination as to whether there are available credits to use for enabling a more responsive wakeup, e.g., by reference to a credit counter. If not, control passes to diamond 480 to determine whether the maximum interrupt off time has expired. In an embodiment, this determination may be based on analysis of an off time timer. When this maximum interrupt off time concludes, control then passes to block 485 for entry into the on state. If the power cap is not violated by enabling a reduced off time that corresponds to the minimum interrupt off time, control passes to diamond 475 to determine whether the minimum interrupt off time has expired. In an embodiment, this determination may be based on analysis of an off time timer. Note also here that the credit counter may be decremented to reflect this credit consumption. When this minimum interrupt off time concludes, control then passes to block 485 for entry into the on state. Although shown at this high level in the embodiment of FIG. 5, understand the scope of the present invention is not limited in this regard.

Thus as seen in FIG. 5, if an interrupt arrives sooner than the maximum background off time, the circuit may wake sooner but the wake-up depends on how long the circuit has been off. If the interrupt is within the minimum interrupt off time of the background wake-up time, then the circuit was about to wake anyway and so thus wake as if there has been no interrupt. Also here, by the holding of the wakeup for the maximum interrupt off time before handling this interrupt, the credit counter can be incremented. If the interrupt is received earlier than that, then the circuit continues to sleep for the minimum interrupt off time, but only if it can do so without violating the power cap. Instead, if the interrupt is received very close to the turn-off, then waking is delayed until the maximum interrupt off time in order to maintain the power cap. Note that a "credit" can be thought of as a place where a wake-up due to an interrupt was combined with a wake-up due to background time; in the worst case, the system plans for every interrupt wake to be serviced separately from every background wake, but when they can be combined, efficiency is improved.

Note that method 450 sets forth a simplified form of interrupt-mediated ON-OFF keying and does not include extensions for interrupts occurring near the end of an on period, on time credits in order to improve average interrupt responsiveness, or choosing deeper low power modes based on observed behavior.

Rather than control of a given one or more cores according to power gating, particular units of a processor such as particular functional or execution units may be power controlled in this same ON-OFF keying manner. Furthermore, understand that even during the off times, certain logic and storage components of a processor may remain powered, at least with a retention voltage such that values stored in these structures remain valid. As such, reduced overhead is realized on resumption of processing activities during the on time.

Note also that the ON-OFF keying that is performed according to an embodiment of the present invention occurs when a processor is in an active (e.g., C0) state. That is, the ON-OFF keying is done within a single active state of the processor. The processor can be controlled according to more coarsely grained mechanisms such as an ACPI technique so that the processor itself enters into and exits from low power (e.g., C1-Cn) states according to ACPI handling. Yet during a single C0 or active state interval, potentially many individual on times and off times occur according to ON-OFF keying in accordance with an embodiment of the present invention. Note, however, that off times due to C1-Cn states save energy, and where the goal is to cap overall energy or power use, the energy saved by C1-Cn states may be used to allow higher energy use during C0 execution. That is, while ON-OFF keying is performed in C0 without need or control of deeper C1-Cn states, the cap goals of ON-OFF keying may be adjusted according to actual patterns of C1-Cn states.

Embodiments thus vary both on and off times of cycle. Using an embodiment, energy and power consumption may be reduced at low operating voltage and execution speed. Such techniques are generally applicable to power management of processors and other integrated circuits incorporated into many different platform types including mobile, desktop/server, and graphics systems.

Figure 6:
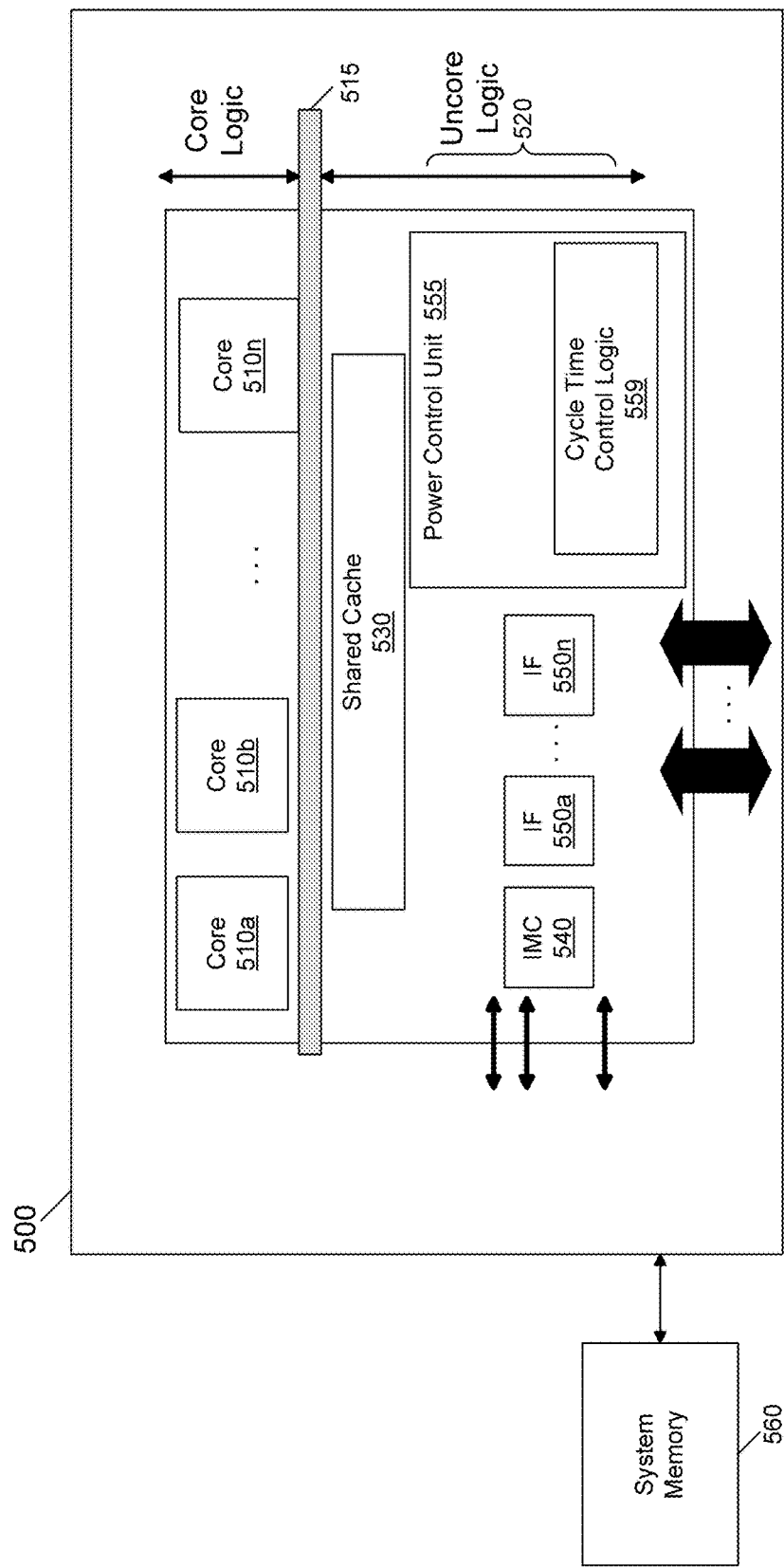
FIG. 6 is a block diagram of a processor in accordance with an embodiment of the present invention.

Embodiments can be implemented in processors for various markets including server processors, desktop processors, mobile processors and so forth. Referring now to FIG. 6, shown is a block diagram of a processor in accordance with an embodiment of the present invention. As shown in FIG. 6, processor 500 may be a multicore processor including a plurality of cores 510*a*-510*n*. In one embodiment, each such core may be of an independent power domain and can be configured to enter and exit active states and/or turbo modes based on workload. The various cores may be coupled via an interconnect 515 to a system agent or uncore 520 that includes various components. As seen, the uncore 520 may include a shared cache 530 which may be a last level cache. In addition, the uncore may include an integrated memory controller 540, various interfaces 550 and a power control unit 555.

In various embodiments, power control unit 555 may include a cycle time control logic 559 in accordance with an embodiment of the present invention. As described above, this logic is configured to dynamically determine on and off times for implementation of interrupt-mediated ON-OFF keying power control logic for the system, thus reducing overhead of the power control as much as possible.

With further reference to FIG. 6, processor 500 may communicate with a system memory 560, e.g., via a memory bus. In addition, by interfaces 550, connection can be made to various off-chip components such as peripheral devices, mass storage and so forth. While shown with this particular implementation in the embodiment of FIG. 6, the scope of the present invention is not limited in this regard.

Figure 7:
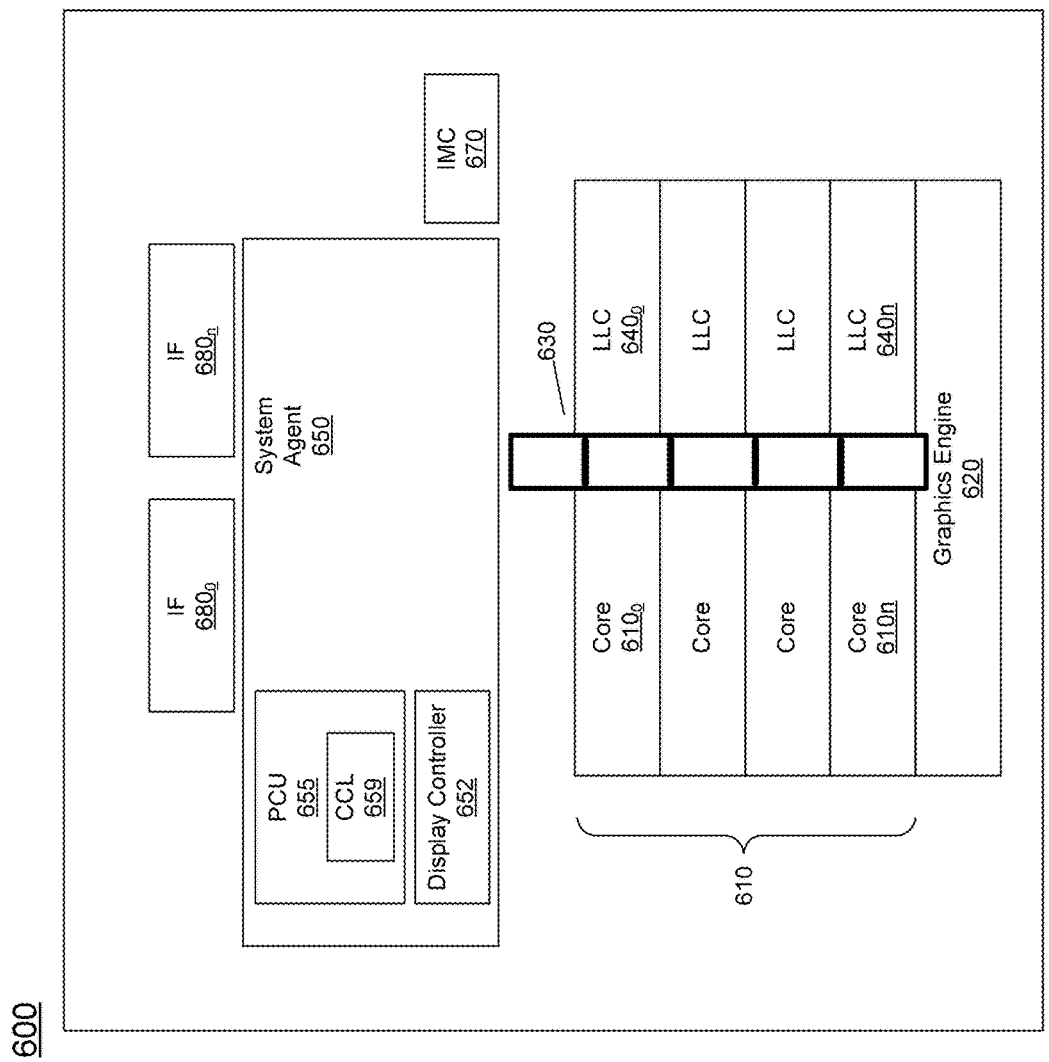
FIG. 7 is a block diagram of a multi-domain processor in accordance with an embodiment of the present invention.

Referring now to FIG. 7, shown is a block diagram of a multi-domain processor in accordance with another embodiment of the present invention. As shown in the embodiment of FIG. 7, processor 600 includes multiple domains. Specifically, a core domain 610 can include a plurality of cores 610$_0$-610$_n$, a graphics domain 620 can include one or more graphics engines, and a system agent domain 650 may further be present. In some embodiments, system agent domain 650 may execute at an independent frequency than the core domain and may remain powered on at all times to handle power control events and power management such that domains 610 and 620 can be controlled to dynamically enter into and exit high power and low power states. Each of domains 610 and 620 may operate at different voltage and/or power. Note that while only shown with three domains, understand the scope of the present invention is not limited in this regard and additional domains can be present in other embodiments. For example, multiple core domains may be present each including at least one core.

In general, each core 610 may further include low level caches in addition to various execution units and additional processing elements. In turn, the various cores may be coupled to each other and to a shared cache memory formed of a plurality of units of a last level cache (LLC) 640$_0$-640$_n$. In various embodiments, LLC 640 may be shared amongst the cores and the graphics engine, as well as various media processing circuitry. As seen, a ring interconnect 630 thus couples the cores together, and provides interconnection between the cores, graphics domain 620 and system agent circuitry 650. In one embodiment, interconnect 630 can be part of the core domain. However in other embodiments the ring interconnect can be of its own domain.

As further seen, system agent domain 650 may include display controller 652 which may provide control of and an interface to an associated display. As further seen, system agent domain 650 may include a power control unit 655 which can include a cycle control logic 659 in accordance with an embodiment of the present invention to enable configurable dynamic control of the cycle time for performing interrupt-mediated ON-OFF keying power control during an active state of one or more cores as described herein. In various embodiments, this logic may be configured as in FIG. 4 and may execute the algorithm described above in FIG. 5.

As further seen in FIG. 7, processor 600 can further include an integrated memory controller (IMC) 670 that can provide for an interface to a system memory, such as a dynamic random access memory (DRAM). Multiple interfaces 680$_0$-680$_n$ may be present to enable interconnection between the processor and other circuitry. For example, in one embodiment at least one direct media interface (DMI) interface may be provided as well as one or more Peripheral Component Interconnect Express (PCI Express™ (PCIe™)) interfaces. Still further, to provide for communications between other agents such as additional processors or other circuitry, one or more interfaces in accordance with an Intel® Quick Path Interconnect (QPI) protocol may also be provided. Although shown at this high level in the embodiment of FIG. 7, understand the scope of the present invention is not limited in this regard.

Figure 8:
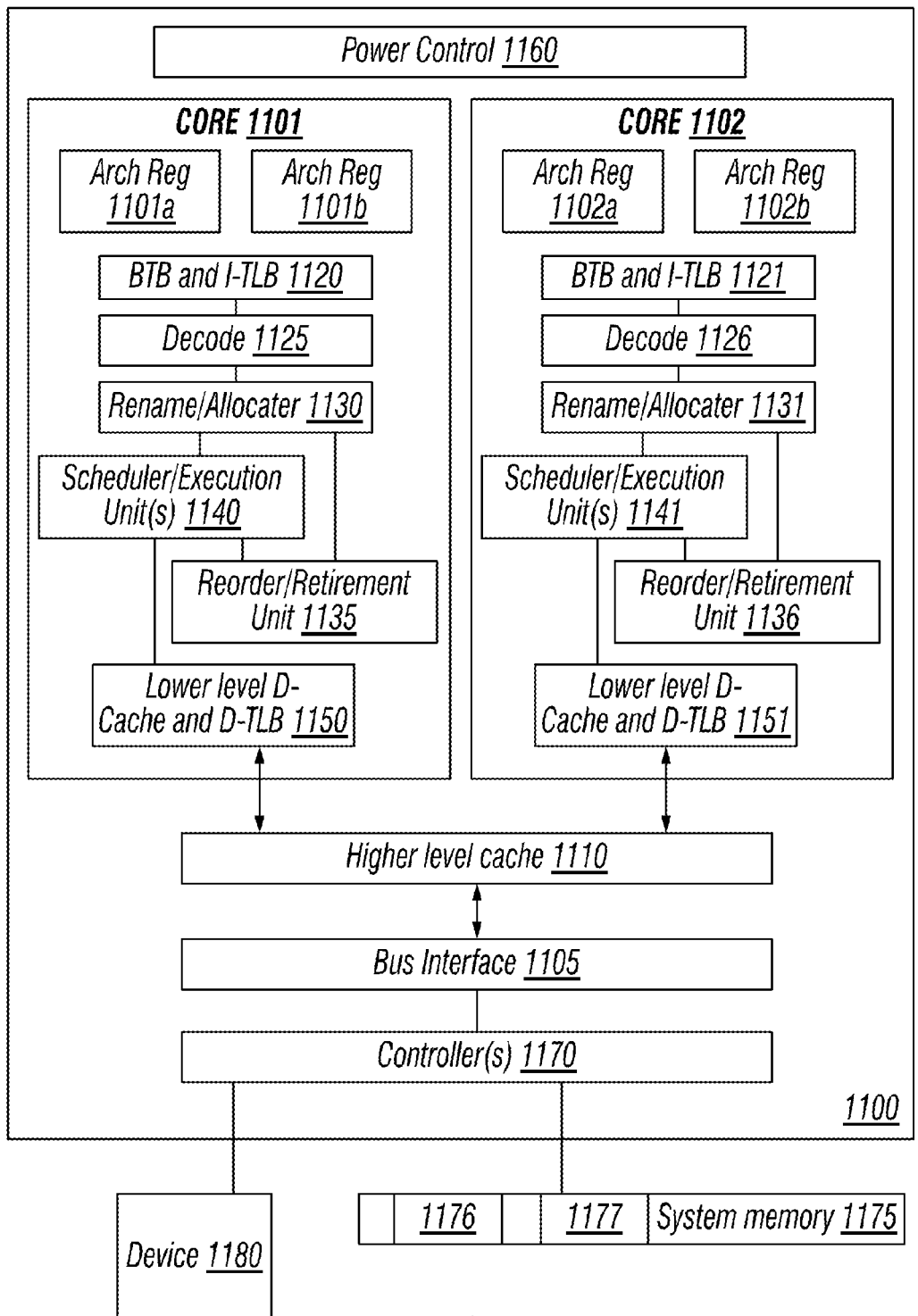
FIG. 8 is a block diagram of a processor including multiple cores in accordance with an embodiment of the present invention.

Referring to FIG. 8, an embodiment of a processor including multiple cores is illustrated. Processor 1100 includes any processor or processing device, such as a microprocessor, an embedded processor, a digital signal processor (DSP), a network processor, a handheld processor, an application processor, a co-processor, a system on a chip (SOC), or other device to execute code. Processor 1100, in one embodiment, includes at least two cores—cores 1101 and 1102, which may include asymmetric cores or symmetric cores (the illustrated embodiment). However, processor 1100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1100, as illustrated in FIG. 8, includes two cores, cores 1101 and 1102. Here, cores 1101 and 1102 are considered symmetric cores, i.e., cores with the same configurations, functional units, and/or logic. In another embodiment, core 1101 includes an out-of-order processor core, while core 1102 includes an in-order processor core. However, cores 1101 and 1102 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 1101 are described in further detail below, as the units in core 1102 operate in a similar manner.

As depicted, core 1101 includes two hardware threads 1101a and 1101b, which may also be referred to as hardware thread slots 1101a and 1101b. Therefore, software entities, such as an operating system, in one embodiment potentially view processor 1100 as four separate processors, i.e., four logical processors or processing elements capable of executing four software threads concurrently. As alluded to above, a first thread is associated with architecture state registers 1101a, a second thread is associated with architecture state registers 1101b, a third thread may be associated with architecture state registers 1102a, and a fourth thread may be associated with architecture state registers 1102b. Here, each of the architecture state registers (1101a, 1101b, 1102a, and 1102b) may be referred to as processing elements, thread slots, or thread units, as described above. As illustrated, architecture state registers 1101a are replicated in architecture state registers 1101b, so individual architecture states/contexts are capable of being stored for logical processor 1101a and logical processor 1101b. In core 1101, other smaller resources, such as instruction pointers and renaming logic in allocator and renamer block 1130 may also be replicated for threads 1101a and 1101b. Some resources, such as re-order buffers in reorder/retirement unit 1135, ILTB 1120, load/store buffers, and queues may be shared through partitioning. Other resources, such as general purpose internal registers, page-table base register(s), low-level data-cache and data-TLB 1115, execution unit(s) 1140, and portions of out-of-order unit 1135 are potentially fully shared.

Processor 1100 often includes other resources, which may be fully shared, shared through partitioning, or dedicated by/to processing elements. In FIG. 8, an embodiment of a purely exemplary processor with illustrative logical units/resources of a processor is illustrated. Note that a processor may include, or omit, any of these functional units, as well as include any other known functional units, logic, or firmware not depicted. As illustrated, core 1101 includes a simplified, representative out-of-order (OOO) processor core. But an in-order processor may be utilized in different embodiments. The OOO core includes a branch target buffer 1120 to predict branches to be executed/taken and an instruction-translation buffer (I-TLB) 1120 to store address translation entries for instructions.

Core 1101 further includes decode module 1125 coupled to fetch unit 1120 to decode fetched elements. Fetch logic, in one embodiment, includes individual sequencers associated with thread slots 1101a, 1101b, respectively. Usually core 1101 is associated with a first ISA, which defines/specifies instructions executable on processor 1100. Often machine code instructions that are part of the first ISA include a portion of the instruction (referred to as an opcode), which references/specifies an instruction or operation to be performed. Decode logic 1125 includes circuitry that recognizes these instructions from their opcodes and passes the decoded instructions on in the pipeline for processing as defined by the first ISA. For example, decoders 1125, in one embodiment, include logic designed or adapted to recognize specific instructions, such as transactional instruction. As a result of the recognition by decoders 1125, the architecture or core 1101 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 1130 includes an allocator to reserve resources, such as register files to store instruction processing results. However, threads 1101a and 1101b are potentially capable of out-of-order execution, where allocator and renamer block 1130 also reserves other resources, such as reorder buffers to track instruction results. Unit 1130 may also include a register renamer to rename program/instruction reference registers to other registers internal to processor 1100. Reorder/retirement unit 1135 includes components, such as the reorder buffers mentioned above, load buffers, and store buffers, to support out-of-order execution and later in-order retirement of instructions executed out-of-order.

Scheduler and execution unit(s) block 1140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1150 are coupled to execution unit(s) 1140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages Here, cores 1101 and 1102 share access to higher-level or further-out cache 1110, which is to cache recently fetched elements. Note that higher-level or further-out refers to cache levels increasing or getting further away from the execution unit(s). In one embodiment, higher-level cache 1110 is a last-level data cache—last cache in the memory hierarchy on processor 1100—such as a second or third level data cache. However, higher level cache 1110 is not so limited, as it may be associated with or includes an instruction cache. A trace cache—a type of instruction cache—instead may be coupled after decoder 1125 to store recently decoded traces.

In the depicted configuration, processor 1100 also includes bus interface module 1105 and a power controller 1160, which may perform power sharing control in accordance with an embodiment of the present invention. Historically, controller 1170 has been included in a computing system external to processor 1100. In this scenario, bus interface 1105 is to communicate with devices external to processor 1100, such as system memory 1175, a chipset (often including a memory controller hub to connect to memory 1175 and an I/O controller hub to connect peripheral devices), a memory controller hub, a northbridge, or other integrated circuit. And in this scenario, bus 1105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1175 may be dedicated to processor 1100 or shared with other devices in a system. Common examples of types of memory 1175 include DRAM, SRAM, non-volatile memory (NV memory), and other known storage devices. Note that device 1180 may include a graphic accelerator, processor or card coupled to a memory controller hub, data storage coupled to an I/O controller hub, a wireless transceiver, a flash device, an audio controller, a network controller, or other known device.

Note however, that in the depicted embodiment, the controller 1170 is illustrated as part of processor 1100. Recently, as more logic and devices are being integrated on a single die, such as SOC, each of these devices may be incorporated on processor 1100. For example in one embodiment, memory controller hub 1170 is on the same package and/or die with processor 1100. Here, a portion of the core (an on-core portion) includes one or more controller(s) 1170 for interfacing with other devices such as memory 1175 or a graphics device 1180. The configuration including an interconnect and controllers for interfacing with such devices is often referred to as an on-core (or un-core configuration). As an example, bus interface 1105 includes a ring interconnect with a memory controller for interfacing with memory 1175 and a graphics controller for interfacing with graphics processor 1180. Yet, in the SOC environment, even more devices, such as the network interface, co-processors, memory 1175, graphics processor 1180, and any other known computer devices/interface may be integrated on a single die or integrated circuit to provide small form factor with high functionality and low power consumption.

Figure 9:
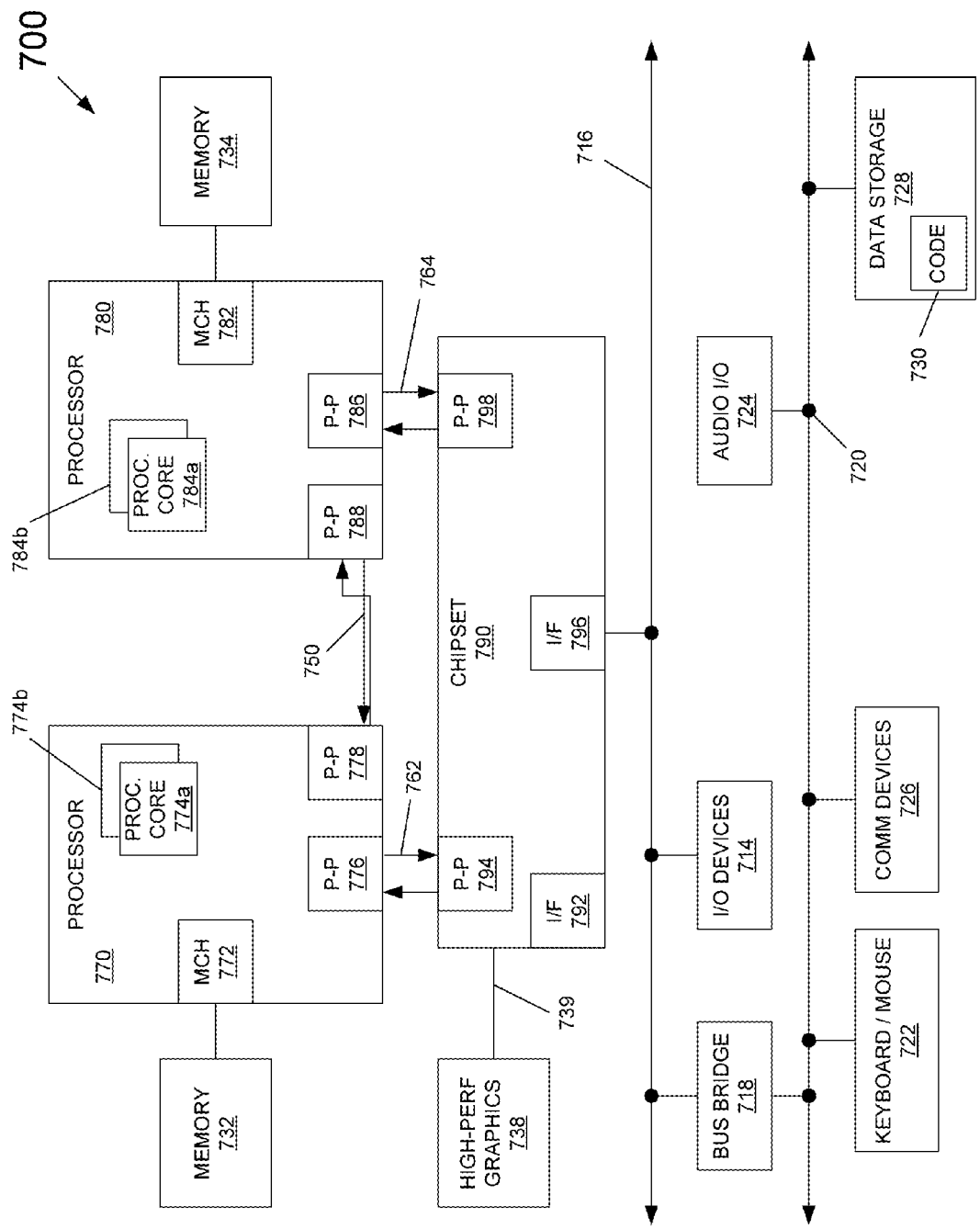
FIG. 9 is a block diagram of a system in accordance with an embodiment of the present invention.

Embodiments may be implemented in many different system types. Referring now to FIG. 9, shown is a block diagram of a system in accordance with an embodiment of the present invention. As shown in FIG. 9, multiprocessor system 700 is a point-to-point interconnect system, and includes a first processor 770 and a second processor 780 coupled via a point-to-point interconnect 750. As shown in FIG. 9, each of processors 770 and 780 may be multicore processors, including first and second processor cores (i.e., processor cores 774a and 774b and processor cores 784a and 784b), although potentially many more cores may be present in the processors. Each of the processors can include a PCU or other logic to perform interrupt-mediated ON-OFF keying cycle control to dynamically control on and off times, as described herein.

Still referring to FIG. 9, first processor 770 further includes a memory controller hub (MCH) 672 and point-to-point (P-P) interfaces 776 and 778. Similarly, second processor 780 includes a MCH 782 and P-P interfaces 786 and 788. As shown in FIG. 9, MCH's 772 and 782 couple the processors to respective memories, namely a memory 732 and a memory 734, which may be portions of system memory (e.g., DRAM) locally attached to the respective processors. First processor 770 and second processor 780 may be coupled to a chipset 790 via P-P interconnects 762 and 764, respectively. As shown in FIG. 9, chipset 790 includes P-P interfaces 794 and 798.

Furthermore, chipset 790 includes an interface 792 to couple chipset 790 with a high performance graphics engine 738, by a P-P interconnect 739. In turn, chipset 790 may be coupled to a first bus 716 via an interface 796. As shown in FIG. 9, various input/output (I/O) devices 714 may be coupled to first bus 716, along with a bus bridge 718 which couples first bus 716 to a second bus 720. Various devices may be coupled to second bus 720 including, for example, a keyboard/mouse 722, communication devices 726 and a data storage unit 728 such as a disk drive or other mass storage device which may include code 730, in one embodiment. Further, an audio I/O 724 may be coupled to second bus 720. Embodiments can be incorporated into other types of systems including mobile devices such as a smart cellular telephone, tablet computer, netbook, Ultrabook™, or so forth.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

The following examples pertain to further embodiments.

In one example, an apparatus comprises a plurality of circuits to independently operate, and a first logic coupled to the plurality of circuits to cause at least one of the plurality of circuits to operate with a power control cycle including a plurality of on times and a plurality of off times according to an ON-OFF keying protocol, each of the plurality of off times to be of a first off duration if no interrupt is pending during the off time and of a second off duration if an interrupt is pending during the off time.

In an example, the first logic is to dynamically calculate an on time based at least in part on a requested speed and a duration of a prior off time.

In an example, the first off duration corresponds to a maximum off time for a platform including the apparatus and the second off duration corresponds to a maximum interrupt off time for the platform.

In an example, the first logic is to cause the at least one circuit to exit a current off time before the maximum interrupt off time if a time remaining for the current off time is greater than a minimum interrupt off time for the platform.

In an example, a configuration storage is to store the maximum off time, and the configuration register is to be updated responsive to reconfiguration of the platform to include a new hardware device.

In an example, the first logic is to cause the at least one circuit to delay exit from a current on time when an interrupt is received.

In an example, the at least one circuit is to perform a background task after entry into an on time after the first off duration.

In an example, the at least one circuit is to handle an interrupt after entry into an on time after the second off duration.

In an example, the first logic is to cause the at least one circuit to enter a first low power state when at least some of the plurality of off times exceed a threshold, and otherwise cause the at least one circuit to enter a second low power state, and the first low power state is deeper than the second low power state.

In an example, the first logic is to cause the at least one circuit to have an on time having a first on duration when the on time follows an off time having the first off duration and to have an on time having a second on duration when the on time follows an off time having the second off duration, the first on duration longer than the second on duration.

In an example, the first logic is to issue at least one power gate control signal to cause one or more switches to control an ON condition and an OFF condition for one or more of the plurality of circuits of the apparatus.

In an example, the apparatus is a processor having a PCU including the first logic, where the PCU is to select ON-OFF keying for a minimum voltage condition (Vmin) of the processor and to select a voltage-frequency scaling for a voltage condition of the processor greater than the Vmin.

In another example, a machine-readable medium has stored thereon instructions, which if performed by a machine cause the machine to perform a method comprising exiting a low power state of at least one processing unit of a processor at a conclusion of a first maximum off time if no interrupt is received during the low power state, exiting the low power state at a conclusion of a second maximum off time if an interrupt is received during the low power state, the second maximum off time less than the first maximum off time, and entering an active state of the at least one processing unit for an on time having a duration based at least in part on whether the low power state was of the first maximum off time or the second maximum off time.

In an example, the method further comprises exiting the low power state at a conclusion of a minimum off time if the interrupt is received prior to a threshold duration before the conclusion of the first maximum off time.

In an example, the method further comprises power controlling the one or more processing units, including issuing a power gate signal to one or more power gates of the processor, the power gates active to gate power during the low power state.

In an example, the method further comprises power controlling the at least one processing unit according to ON-OFF keying for a minimum voltage condition (Vmin) of the processor and power controlling the one or more processing units according to a voltage-frequency scaling for a voltage condition of the processor greater than the Vmin.

In another example, a processor comprises an exit logic to cause at least one functional unit of the processor to be in a low power state for a first duration if no interrupt is received during the first duration and to cause the at least one functional unit to be in the low power state for a second duration if an interrupt is received during the second duration, the second duration less than the first duration, and where the first duration corresponds to a maximum off time for a platform including the processor, and a cycle controller to issue at least one power control signal according to a power control cycle including a plurality of on times and a plurality of off times according to an ON-OFF keying protocol, and the plurality of on times and the plurality of off times are variable to substantially maintain a requested speed for the processor.

In an example, the processor further comprises calculation logic to calculate an on duration for the at least one functional unit following the low power state based at least in part on whether the at least one functional unit was in the low power state for the first duration or the second duration.

In an example, the processor further comprises credit logic to update a credit value when an interrupt is received within a threshold duration of a conclusion of the first duration and the at least one functional unit is to remain in the low power state until the conclusion of the first duration.

In an example, based at least in part on the credit value, the exit logic is to cause the at least one functional unit to be in the low power state for a third duration less than the second duration if an interrupt is received more than the threshold duration from the conclusion of the first duration.

In an example, the processor further comprises a first timer to count an on time duration in which the at least one functional unit is in an active state and a second timer to count an off time duration in which the at least one functional unit is in the low power state.

Note that the above processor can be implemented using various means.

In an example, the processor comprises a system on a chip (SoC) incorporated in a user equipment touch-enabled device.

In another example, a system comprises a display and a memory, and includes the processor of one or more of the above examples.

In one example, a processor comprises a plurality of circuits to independently operate, and means coupled to the plurality of circuits for causing at least one of the plurality of circuits to operate with a power control cycle including a plurality of on times and a plurality of off times according to an ON-OFF keying protocol, each of the plurality of off times to be of a first off duration if no interrupt is pending during the off time and of a second off duration if an interrupt is pending during the off time.

In another example, a method comprises exiting a low power state of at least one processing unit of a processor at a conclusion of a first maximum off time if no interrupt is received during the low power state, exiting the low power state at a conclusion of a second maximum off time if an interrupt is received during the low power state, the second maximum off time less than the first maximum off time, and entering an active state of the at least one processing unit for an on time having a duration based at least in part on whether the low power state was of the first maximum off time or the second maximum off time.

In an example, the method further comprises exiting the low power state at a conclusion of a minimum off time if the interrupt is received prior to a threshold duration before the conclusion of the first maximum off time.

In an example, the method further comprises power controlling the one or more processing units, including issuing a power gate signal to one or more power gates of the processor, the power gates active to gate power during the low power state.

In an example, the method further comprises power controlling the at least one processing unit according to ON-OFF keying for a minimum voltage condition (Vmin) of the processor and power controlling the one or more processing units according to a voltage-frequency scaling for a voltage condition of the processor greater than the Vmin.

In another example, a machine-readable medium having stored thereon instructions, configured to perform the method of any one of the above examples.

In another example, an apparatus comprises means to perform a method as claims in any one of the above examples.

Understand that various combinations of the above examples are possible.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
    a plurality of circuits to independently operate; and
    a first logic coupled to the plurality of circuits to cause at least one of the plurality of circuits to operate with a power control cycle including a plurality of on times and a plurality of off times according to an ON-OFF keying protocol, each of the plurality of off times to be of a first off duration if no interrupt is pending during the off time and of a second off duration if an interrupt is pending during the off time, wherein the first off duration corresponds to a maximum off time for a platform including the processor and the second off duration corresponds to a maximum interrupt off time for a hardware device of the platform, wherein the first logic is to cause the at least one circuit to delay exit from a current on time when an interrupt is received.

2. The processor of claim 1, wherein, after receipt of an interrupt, the first logic is to cause the at least one circuit to exit a current off time before the maximum interrupt off time if a time remaining for the current off time is greater than a minimum interrupt off time for the platform, the minimum interrupt off time corresponding to a threshold time before an end of the current off time.

3. The processor of claim 2, wherein the first logic is to cause the at least one circuit to exit the current off time before the maximum interrupt off time based on credit information.

4. The processor of claim 3, wherein the first logic is to accumulate the credit information when an on time has a duration less than a calculated on time.

5. The processor of claim 1, further comprising a configuration storage to store the maximum off time, wherein the configuration register is to be updated responsive to reconfiguration of the platform to include a new hardware device.

6. The processor of claim 1, wherein the first logic is to cause the at least one circuit to enter a first low power state when at least some of the plurality of off times exceed a threshold, and otherwise cause the at least one circuit to enter a second low power state, wherein the first low power state is deeper than the second low power state.

7. The processor of claim 1, wherein the first logic is to cause the at least one circuit to have an on time having a first on duration when the on time follows an off time having the first off duration and to have an on time having a second on duration when the on time follows an off time having the second off duration, the first on duration longer than the second on duration.

8. The processor of claim 1, wherein the first logic is to issue at least one power gate control signal to cause one or more switches to control an ON condition and an OFF condition for one or more of the plurality of circuits of the processor.

9. The processor of claim 1, wherein the processor further comprises a power control unit (PCU) including the first logic, wherein the PCU is to select ON-OFF keying for a minimum voltage condition (Vmin) of the processor and to select a voltage-frequency scaling for a voltage condition of the processor greater than the Vmin.

10. A non-transitory machine-readable medium having stored thereon instructions, which if performed by a machine cause the machine to perform a method comprising:
    exiting a low power state of at least one processing unit of a processor at a conclusion of a first maximum off time if no interrupt is received during the low power state, the first maximum off time corresponding to a maximum off time for a hardware device of the machine;
    exiting the low power state at a conclusion of a second maximum off time if an interrupt is received during the low power state, the second maximum off time extending from receipt of the interrupt until the low power state is exited and is less than the first maximum off time, the second maximum off time corresponding to a maximum interrupt off time for a hardware device of the machine; and entering an active state of the at least one processing unit from the low power state for an on time having a duration based at least in part on whether the low power state was of the first maximum off time or the second maximum off time.

11. The non-transitory machine-readable medium of claim 10, wherein the method further comprises exiting the low power state at a conclusion of a minimum off time if the interrupt is received prior to a threshold duration before the conclusion of the first maximum off time.

12. The non-transitory machine-readable medium of claim 11, wherein the method further comprises exiting the low power state at the conclusion of the minimum off time based on credit information.

13. The non-transitory machine-readable medium of claim 12, wherein the method further comprises accumulating the credit information when an on time has a duration less than a calculated on time.

14. The non-transitory machine-readable medium of claim 10, wherein the method further comprises power controlling the one or more processing units, including issuing a power gate signal to one or more power gates of the processor, the power gates active to gate power during the low power state.

15. The non-transitory machine-readable medium of claim 10, wherein the method further comprises power controlling the at least one processing unit according to ON-OFF keying for a minimum voltage condition (Vmin) of the processor and power controlling the one or more processing units according to a voltage-frequency scaling for a voltage condition of the processor greater than the Vmin.

16. A processor comprising:
an exit logic to cause at least one functional unit of the processor to be in a low power state for a first duration if no interrupt is received during the first duration and to cause the at least one functional unit to be in the low power state for a second duration if an interrupt is received during the second duration, the second duration less than the first duration, and wherein the first duration corresponds to a maximum off time for a platform including the processor and based on a responsiveness requirement of a component of the platform;

credit logic to update a credit value when an interrupt is received within a threshold duration of a conclusion of the first duration and the at least one functional unit is to remain in the low power state until the conclusion of the first duration, wherein, based at least in part on the credit value, the exit logic is to cause the at least one functional unit to be in the low power state for a third duration less than the second duration if an interrupt is received more than the threshold duration from the conclusion of the first duration; and a cycle controller to issue at least one power control signal according to a power control cycle including a plurality of on times and a plurality of off times according to an ON-OFF keying protocol, wherein the plurality of on times and the plurality of off times are variable to substantially maintain a requested speed for the processor.

17. The processor of claim 16, further comprising calculation logic to calculate an on duration for the at least one functional unit following the low power state based at least in part on whether the at least one functional unit was in the low power state for the first duration or the second duration.

18. The processor of claim 16, wherein the processor comprises a multicore processor including a plurality of cores and a power control unit (PCU), the PCU including the exit logic and the cycle controller.

19. The processor of claim 18, further comprising a first timer to count an on time duration in which the at least one functional unit is in an active state and a second timer to count an off time duration in which the at least one functional unit is in the low power state.

* * * * *